(12) United States Patent
Valliath

(10) Patent No.: US 9,581,131 B1
(45) Date of Patent: Feb. 28, 2017

(54) AEROSTATIC FORCE TRANSDUCER

(71) Applicant: George Thomas Valliath, Winnetka, IL (US)

(72) Inventor: George Thomas Valliath, Winnetka, IL (US)

(73) Assignee: AEROSTATIC ENGINES, LLC, Evanston, IL (US)

( * ) Notice: Subject to any disclaimer, the term of this patent is extended or adjusted under 35 U.S.C. 154(b) by 255 days.

(21) Appl. No.: 14/211,351

(22) Filed: Mar. 14, 2014

Related U.S. Application Data

(60) Provisional application No. 61/783,378, filed on Mar. 14, 2013.

(51) Int. Cl.
| | | |
|---|---|---|
| *F03B 13/00* | (2006.01) | |
| *F03B 13/04* | (2006.01) | |
| *F03B 17/02* | (2006.01) | |
| *F03B 13/14* | (2006.01) | |
| *F03B 13/18* | (2006.01) | |

(52) U.S. Cl.
CPC .............. *F03B 17/02* (2013.01); *F03B 13/04* (2013.01); *F03B 13/148* (2013.01); *F03B 13/18* (2013.01); *F03B 13/1845* (2013.01); *Y02E 10/38* (2013.01)

(58) Field of Classification Search
CPC ........ F03B 13/14; F03B 13/148; F03B 13/18; F03B 13/1845; Y02E 10/38
USPC .................................................. 60/495, 698
See application file for complete search history.

(56) References Cited

U.S. PATENT DOCUMENTS

| | | | | |
|---|---|---|---|---|
| 4,337,052 A | * | 6/1982 | Kitabayashi | ............ B63B 25/08 440/9 |
| 4,412,417 A | * | 11/1983 | Dementhon | .......... F03B 13/183 415/7 |
| 4,955,832 A | * | 9/1990 | Hansch | .................. B63H 19/02 440/113 |

* cited by examiner

*Primary Examiner* — Audrey K Bradley
*Assistant Examiner* — Dapinder Singh

(57) ABSTRACT

In one aspect, a device comprises a means for generating an aerostatic force exclusive of a buoyancy force acting on the device, wherein the aerostatic force acting on the device is a significant portion of a total force acting on the device due to the aerostatic force exclusive of a buoyancy force, a reaction force, and a buoyancy force. In another aspect, a device includes a cavity with a first internal pressure of a first fluid, and a plurality of conduits extending from the cavity to an environment outside of the device with a second pressure different from the first pressure, wherein fluid flows through the plurality of conduits, and an aerostatic force exclusive of a buoyancy force acting on the device is greater than a reaction force acting on the device due to the fluid flow or is a substantial portion of the total force acting on the device.

20 Claims, 4 Drawing Sheets

AEROSTATIC FORCE TRANSDUCER

CROSS REFERENCE TO RELATED APPLICATION

This application claims the benefit of U.S. Provisional Application No. 61/783,378 entitled "Aerostatic Force Transducer" filed on Mar. 14, 2013, the entire contents are incorporated by reference herein.

BACKGROUND

The subject matter disclosed herein generally relates to devices, systems and methods for generating a force on an object to do work. There is an un-met need for a more flexible system, method and device for generating a force on an object to do work.

SUMMARY

In one aspect, an aerostatic force transducer includes an active device that converts a pressure difference between a fluid inside the aerostatic force transducer and an environment outside of the device into a force acting on the device using an aerostatic effect. In one aspect, a device includes a means for generating an aerostatic force exclusive of a buoyancy force acting on the device, wherein the aerostatic force exclusive of a buoyancy force acting on the device is a significant portion of a total force acting on the device due to the aerostatic force exclusive of a buoyancy force, a reaction force, and a buoyancy force.

In one embodiment, a device comprises: a cavity with a first internal pressure of a first fluid; and a plurality of conduits extending from the cavity to an environment surrounding the device with a second pressure different from the first pressure, wherein fluid flows through the plurality of conduits, and an aerostatic force exclusive of a buoyancy force acting on the device is greater than a reaction force acting on the device due to the fluid flow, or an aerostatic force exclusive of a buoyancy force acting on the device is a significant portion of a total force acting on the device due to a reaction force, the aerostatic force exclusive of a buoyancy force, and a buoyancy force. In one embodiment, a method of generating force comprises: generating a pressure difference between a cavity within a device and the environment outside of the device, wherein a plurality of conduits extend from the cavity to an environment surrounding the device with a second pressure different from the first pressure, fluid flows through the plurality of conduits, and an aerostatic force exclusive of a buoyancy force acting on the device is greater than a reaction force acting on the device or an aerostatic force exclusive of a buoyancy force is a significant portion of a total force acting on the device due to a reaction force, the aerostatic force exclusive of a buoyancy force, and a buoyancy force.

In another embodiment, a device comprises: a cavity defined at least by a first surface of surface area A, and a second surface opposite the first surface; a plurality of conduits with a plurality of axes opening into the cavity, each conduit has a cross-sectional area perpendicular to an axis of each conduit, and the plurality of conduits define a set of openings in the first surface and have a combined cross-sectional area $\Delta A$ perpendicular to the axes of the conduits; and a mechanism to maintain a pressure difference $\Delta P$ between a pressure outside of the device and a pressure within the cavity such that a net force $\Delta F$ acts upon the device due to the pressure difference $\Delta P$ acting on the combined cross-sectional area $\Delta A$ of the conduits. In one embodiment, an aerostatic force exclusive of a buoyancy force is at least 50% of the net forces $\Delta F$ acting on the device due to an aerostatic force exclusive of a buoyancy force, a reaction force, and buoyancy force. In another embodiment, a fluid flows through the plurality of conduits, the conduits each have a length that is substantially larger than the cross-sectional area, such that the fluid flow is optimized to allow for maximizing a force acting on the device due to an aerostatic effect. In another embodiment, a method of generating force comprises: generating a pressure difference between a cavity within a device and an environment outside of the device, wherein a plurality of conduits extend from the cavity to the environment surrounding the device, wherein fluid flows through the plurality of conduits, and an aerostatic force exclusive of a buoyancy force acting on the device is greater than a reaction force acting on the device, or an aerostatic force exclusive of a buoyancy force acting on the device is a significant portion of the total force acting on the device due to a reaction force, an aerostatic force exclusive of a buoyancy force, and a buoyancy force. In another embodiment, the aerostatic force exclusive of a buoyancy force acting on the device is greater than the buoyancy force acting on the device. In one aspect, the device comprises an Aerostatic Force Transducer (AFT).

DETAILED DESCRIPTION OF THE INVENTION

Figure 1:
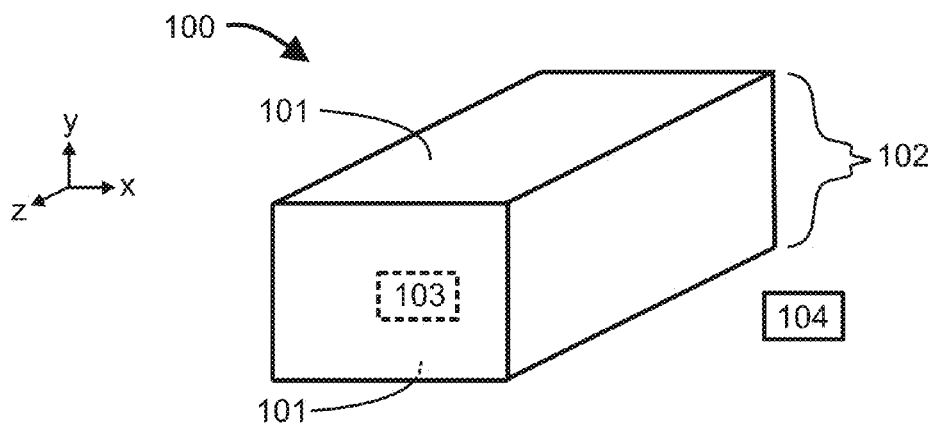
FIG. 1 is a perspective view of a rectangular box with a pressure inside the box and outside of the box.

The features and other details of the invention will now be more particularly described. It will be understood that particular embodiments described herein are shown by way of illustration and not as limitations of the invention. The principal features of this invention can be employed in various embodiments without departing from the scope of the invention. All parts and percentages are by weight unless otherwise specified.

The features and other details of several embodiments will now be more particularly described. It will be understood that particular embodiments described herein are shown by way of illustration and not as limitations. The principal features can be employed in various embodiments without departing from the scope of any particular embodiment. The present inventive subject matter now will be described more fully hereinafter with reference to the accompanying drawings, in which embodiments of the inventive subject matter are shown. However, this inventive subject matter should not be construed as limited to the embodiments set forth herein. Rather, these embodiments are provided so that this disclosure will be thorough and complete, and will fully convey the scope of the inventive subject matter to those skilled in the art. Like numbers refer to like elements throughout. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

When an element such as a layer, region, component, or substrate is referred to herein as being "on" or extending "onto" another element, it can be directly on or extend directly onto the other element or intervening elements may also be present. In contrast, when an element is referred to herein as being "directly on" or extending "directly onto" another element, there are no intervening elements present. Also, when an element is referred to herein as being "connected" or "coupled" to another element, it can be directly connected or coupled to the other element or intervening elements may be present. In contrast, when an element is referred to herein as being "directly connected" or "directly coupled" to another element, there are no intervening elements present. In addition, a statement that a first element is "on" a second element is synonymous with a statement that the second element is "on" the first element.

Although the terms "first", "second", etc. may be used herein to describe various elements, components, regions, layers, sections and/or parameters, these elements, components, regions, layers, sections and/or parameters should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive subject matter.

Furthermore, relative terms, such as "lower" or "bottom" and "upper" or "top," may be used herein to describe one element's relationship to another element as illustrated in the Figures. Such relative terms are intended to encompass different orientations of the device in addition to the orientation depicted in the Figures. For example, if the device in the Figures is turned over, elements described as being on the "lower" or "bottom" side of other elements would then be oriented on the "upper" or "top" sides of the other elements. The exemplary term "lower", can therefore, encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

An aerostatic force transducer (AFT) is an active device that can convert the pressure difference between the air (or gas or other fluid) inside the device and the environment outside of the device into a force that can be harnessed to do work on the device due to an aerostatic effect.

In order for a net force to be created there needs to net difference in the product of the pressures and the areas the pressures act on. An example will be used illustrate an embodiment, wherein the calculations, conclusions, design constraints, etc. for the example will hold for other embodiments and device configurations using other materials, configurations, systems, and applications. For example, as shown in FIG. 1, consider a rectangular box 100 of a height 102 of h with air inside 103 at pressure $P_1$ and atmospheric pressure outside 104 at $P_0$ where pressure is measured in the SI unit of a Pascal where 1 pa=1 N/m2 as shown in FIG. 1.

In this example, assume that the area of the surfaces 101 parallel to the ground is A. In this case the pressures acting upward and the pressures acting downward mostly balance each other out leaving a net force $\Delta F=\rho hA$ as can been seen in the equation:

$$\Delta F=(P_0 A+P_1 A+\rho hA)-(P_1 A+P_0 A)=\rho hA$$

The term $\rho hA$ is the contribution of buoyancy and is the mass of air displaced by the box and where $\rho$ is the density of air at pressure $P_0$. Henceforth, the aerostatic force under consideration is exclusive of buoyancy as the buoyancy force is expected to be negligible with respect to the net force, thus one can ignore the buoyancy term and therefore $\Delta F=0$. In one embodiment, the aerostatic force exclusive of a buoyancy force is a significant portion of a total force acting on the device due to a reaction force, the aerostatic force exclusive of a buoyancy force, and a buoyancy force. In another embodiment, the aerostatic force exclusive of a buoyancy force acting on the device is greater than one or more selected from the group: a reaction force acting on the device, a buoyancy force acting on the device, and a total force acting on the device due to a reaction force and a buoyancy force.

In one embodiment, a device comprises a cavity with a single opening on the bottom and two surfaces parallel to the ground have different areas. In one embodiment, the difference in surface area is $\Delta A$ due to holes in one of the surface. In this case, the above equation will change to:

$$\Delta F=\Delta P\Delta A$$

where $\Delta P=P_1-P_0$ is the difference in pressures between the inside and outside of the device and $\Delta F$ is the maximum possible force that can be generated under this configuration.

The pressure differential, $\Delta P$ acting on the openings with an area equal to the difference in area $\Delta A$ between the surfaces will create a resultant flow of air. This air flow Q, measured in volume per unit time, will in most cases be exceedingly large for any reasonable $\Delta P$ and represents something to be managed for a practical AFT.

The method described here is to minimize the flow rate Q while maximizing the net force $\Delta F$. The flow rate Q can be minimized by leveraging Poiseuille's Law which describes the flow of a fluid in a tube at steady state:

$$Q=(\pi R^4 \Delta P)/8\eta L$$

where R is the radius of the tube, L is the length of the tube and $\eta$ is the viscosity of the fluid. An important consideration here is that the flow $Q \propto R^4$ and $Q \propto 1/L$. This means that if the openings that create the difference in surface area, $\Delta A$, are divided into m holes each of area $\delta A$ such that:

$$\Delta A=m\delta A$$

then the flow rate can be dramatically reduced arbitrarily and independently of $\Delta P$ simply by selecting values for R and L that allows for a practical AFT. A tube is one example of a conduit that may be used for the fluid flow and the results can expand to openings in conduits with non-circular cross-sections.

Figure 2:
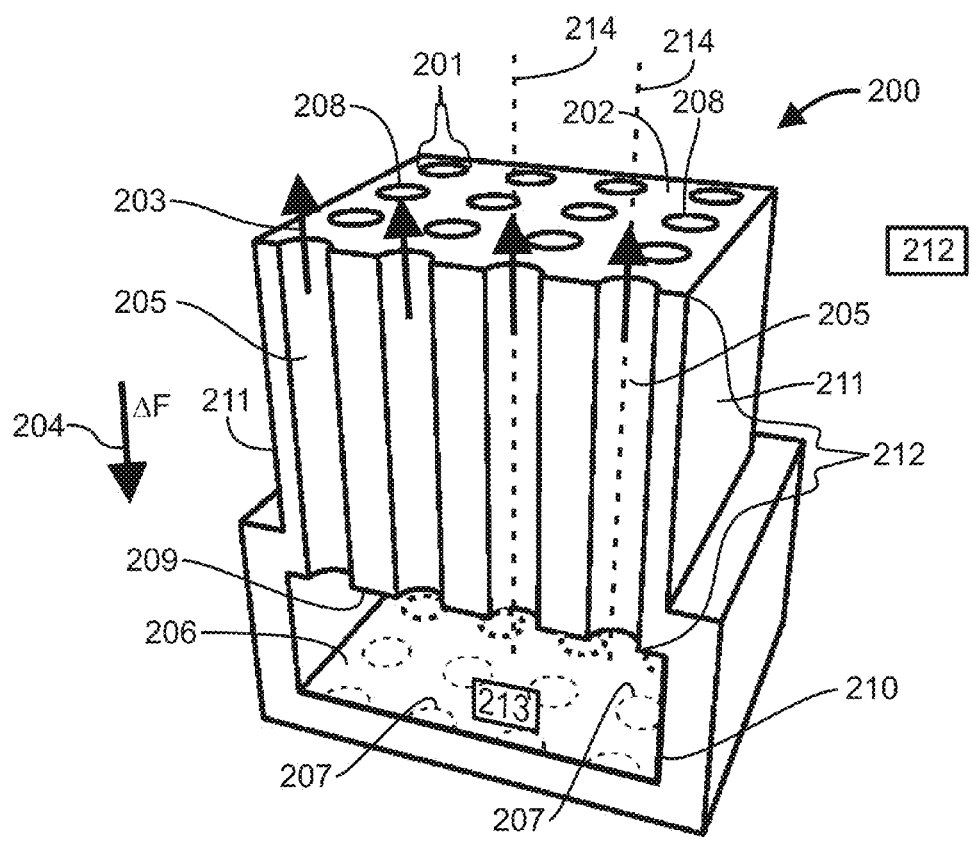
FIG. 2 is a cross-sectional perspective view of one embodiment of an AFT depicting an arrangement with reduced flow.

FIG. 2 is a cross-sectional perspective view of one embodiment of an AFT 200 depicting an arrangement with reduced flow. The embodiment shown in FIG. 2 illustrates a difference in surface area, ΔA, on the top surface 202 of the AFT where the combined cross-sectional area of the plurality of conduits 205 (tubes in this example) in a plane orthogonal to the axis of the conduits 214 is the total area of the openings 208 of the conduits 205 with an inner diameter 201 of D and length 212 of L. In this example, the top surface 202 area is the same as the upper surface 209 area of the cavity 210 since the conduits 205 (or tubes in this example) have a constant inner diameter 201. The projections 207 of the openings 208 in the conduits 205 are shown as dashed circles and arcs on the lower surface 206 of the cavity 210 to illustrate the openings in the conduits 205 on the upper surface 209 that are not visible in this view. The lower surface 206 does not have any openings, conduits, tubes, or channels in this example. The airflow direction 203 is shown for the case where ΔP is positive. If ΔP is negative the flow direction will be reversed by this convention. Extending the same convention, ΔF direction 204 is shown for a positive ΔP. For a negative ΔP the direction of force will be reversed. The volume surrounding the AFT 200 has an atmospheric pressure 212 of $P_0$ and the cavity 210 in the AFT 200 has a pressure 213 of $P_1$. Each opening 208 has an area of $\pi D^2/4$; and since the openings 208 of the conduits 205 are perpendicular to the axes 214 of the conduits 205, the sum of the cross-sectional areas 208 of the conduits 205 adds up to the quantity ΔA. As shown in this example, ΔA does not fill the surface 202 area A that is available and so there is fill factor α defined as ΔA/A.

As described for this embodiment, the force ΔF is a result of the pressure difference ΔP acting on the cross-sectional area of the conduits, ΔA, and not due to the air flow Q. However, the air flow does create a pair of forces that need to be accounted for. These are the Wall Force $F_W$ and the Reaction Force $F_R$. The Wall Force is the force the air flow creates in the direction of flow along the surface of the tube walls. The Reaction Force is the force experienced by the AFT due to mass of the air being emitted. Thus, in one embodiment, one may design a practical AFT using the equation relating the forces:

$$\Delta F = \Delta P \times \Delta A + F_R - F_W$$

where ΔF is to be maximized and $F_R$ is to be minimized. $F_R$ is directly related to the flow rate Q and a high flow rate is not desirable as sustaining large air flow rates requires significant energy input into the system. Also, as Q increases the AFT achieves propulsion similar to a rocket which derives most of its propulsion from the reaction force of the exiting gas. For the above described conditions, simulation shows how the net force ΔF per unit area (N/m²) changes with diameter and length of conduit.

Figure 3:
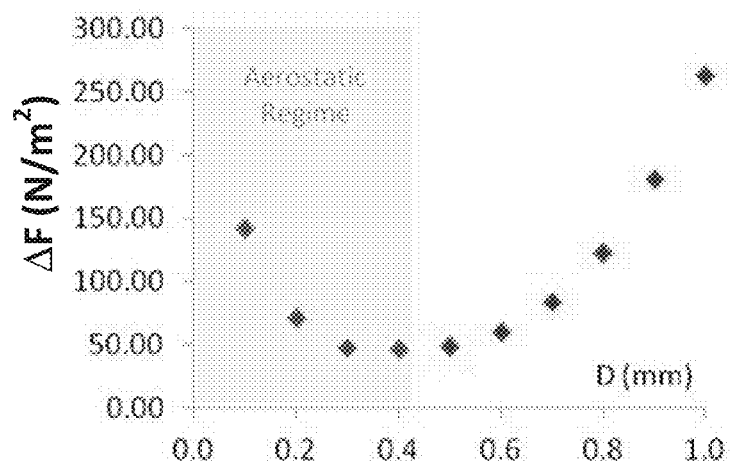
FIG. 3 is a chart of the Net Force per Unit Area as a function of tube diameter for simulation results for one embodiment of an AFT.

FIG. 3 is a chart of the Net Force per Unit Area (N/m2) as a function of conduit diameter for simulation results for one embodiment of an AFT. FIG. 3 is a chart of the simulation results for the case of the conduit length L=200 mm with the largest cross-sectional dimension, D, (the tube inner diameters in this embodiment) varying from 0.1 mm to 1 mm. As can be seen in FIG. 3, there is a minimum at around 0.4 mm. If one wishes to maximize net force while minimizing reaction force then for this embodiment, one would want to operate in the regime such that the parameters for the AFT are left of the minimum as suggested in the chart of FIG. 3. The Aerostatic Regime illustrated in FIG. 1 is for one embodiment, and other embodiments may operate on either side of the minimum.

Figure 4:
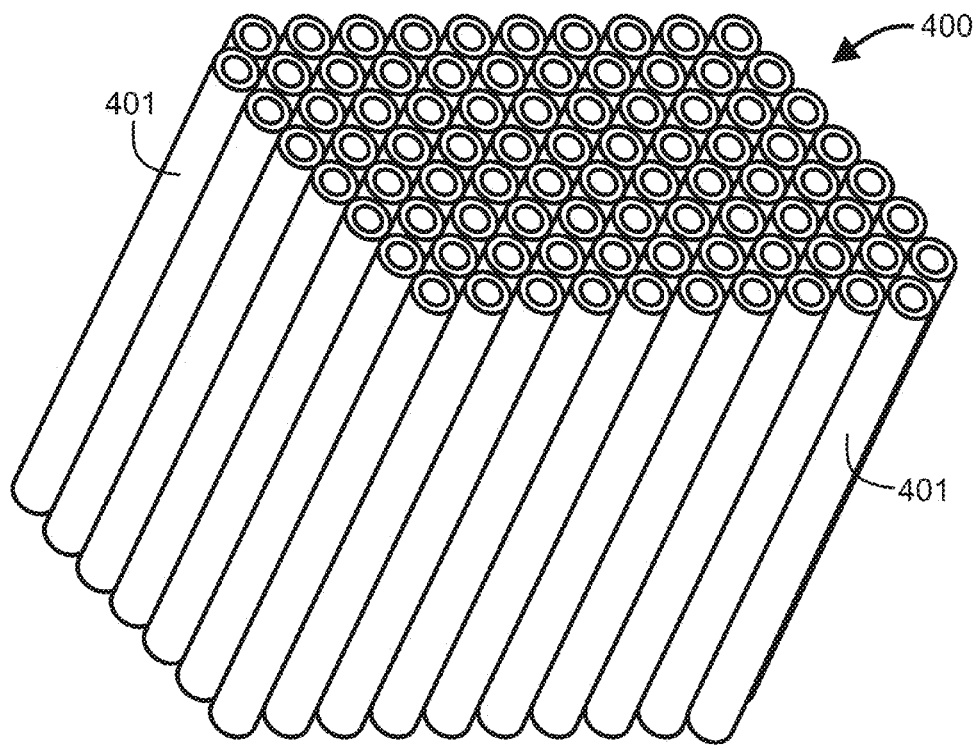
FIG. 4 is a perspective view of an array of close packed tubes.

In one embodiment, the AFT comprises conduits in the form of an array 400 of close packed tubes 401 such as shown in FIG. 4. For clarity, the regions between the glass tubes are not shown as being sealed in FIG. 4. In embodiments where there is not a sealed area between elongated conduits, such as tubes, the open areas between the elongated channels would also need to be factored into the area difference. In one embodiment, an AFT comprises an array of close packed glass tubes with a length, L, of 200 mm, and an inner diameter, D, of 0.1 mm and outer diameter of 0.12, where the regions between the tubes are sealed, which creates a fill factor α=62.98%. A pressure differential ΔP of 0.05 atm, creates a flow rate per unit area of Q=0.18 m³/m²s and a net force per unit area ΔF=60.5 kg/m². The reaction force $F_R$=18 gm/m² which is negligible as was the intent.

In one embodiment, a cavity has a fluid inside at a pressure $P_1$ that is different than the external fluid pressure at $P_0$ such that a difference in pressure $\Delta P = P_1 - P_0$ is created, and the total cross-sectional areas of the openings of the conduits ΔA at one surface represent a surface area difference between the first surface and the second surface resulting in a net force ΔF=ΔP×ΔA where part or all of the force is available to do useful work.

Fluids

In one embodiment, the fluid in the cavity or inner region of the AFT (or device comprising the AFT) or the fluid in the environment comprises one or more selected from the group: liquid, solid, gas, plasma, and combinations thereof (such as mixed gases or a gas comprising particles).

Temperature of the Fluid

In one embodiment, the temperature of the fluid in the cavity or inner region of the AFT (or device comprising the AFT) or the fluid in the environment is greater than one selected from the group −200, −100, −50, −10, 0, 10, 20, 50, 100, 150, and 200 degrees Celsius. In one embodiment, the temperature of the fluid in the cavity or inner region of the AFT (or device comprising the AFT) or the fluid in the environment is less than one selected from the group: −200, −100, −50, −10, 0, 10, 20, 50, 100, 150, and 200 degrees Celsius.

Conduits Extending from the Cavity

In one embodiment, a plurality of conduits extend from the cavity. In one embodiment, the conduits fluidly connect the cavity to the environment surrounding the device. In a further embodiment, the plurality of conduits extend in a first direction along an axis away from the cavity. In one embodiment, the plurality of conduits extend from the cavity in an axial direction substantially normal to the surface of the cavity from which they extend. In another embodiment, the surface from which the plurality of conduits extend is non-planar and/or the axial direction of the plurality of conduits is radial or varies across the surface.

Conduit Cross-Sectional Areas

In another embodiment, the combined cross-sectional areas of the conduit perpendicular to the axes of the conduits, ΔA, is the same as the surface area differences between two or more surfaces of the cavity selected from the group: opposite surfaces, adjacent surfaces, parallel surfaces, surfaces angled to each other at an angle greater than 0 degrees and less than 180 degrees, curved surfaces, irregular surfaces, regular surfaces, planar surfaces, two surfaces, and greater than 2 surfaces.

In one embodiment, the cross-sectional shape of the one or more conduits at the cavity in a plane perpendicular to the axis of the conduit (or the openings in the surface where the conduit intersects the cavity) is one or more selected from the group: circular, rectangular, square, hexagon, polygonal, elliptical, irregular, and randomly shaped. In one embodiment, the conduits extend from the cavity such that the cross-sectional shape of the conduits in a plane perpendicular to the axis of the conduits do not substantially change from the cavity to the environment surrounding the device. In another embodiment, the cross-sectional area of the conduit increases, decreases, or otherwise changes from the inner cavity of the AFT to the ambient environment.

Arrangement of the Openings

In one embodiment, the openings corresponding to the conduits at a surface of the cavity are arranged in a regular, irregular, random, or combination thereof pattern or arrangement. The openings or conduits can be arranged in multiple ways as needed for performance including but not limited to rectangular array and hexagonal close-packed.

Number of Openings, M

In one embodiment, the number of openings, m, in the surface corresponding to the plurality of conduits is greater than one selected from the group: 5, 10, 50, 100, 200, 300, 500, 700, 1000, 5000, 10,000, 20,000, 100,000, 500,000, 1,000,000, 10,000,000, 100,000,000, and 1,000,000,000.

Largest Cross-Sectional Dimension of the Conduits

In one embodiment, the largest cross-sectional dimension, D, (which is the diameter in the case of a circular opening cross-section) of the conduits in a plane orthogonal to the axis of the conduits is chosen to optimize the total flow of fluid out of the cavity and minimize the wall force $F_W$. In one embodiment, a smaller D is used to result in smaller flow rates. In another embodiment, D is less than one or more selected from the group: 100 mm, 10 mm, 5 mm, 1 mm, 0.6 mm, 0.4 mm, 0.3 mm, 0.2 mm, and 0.1 mm. In one embodiment, D≤0.4 mm and the flow rate is kept low. In one embodiment, D is greater than 100 mm, 10 mm, 5 mm, 1 mm, 0.6 mm, 0.4 mm, 0.3 mm, 0.2 mm, and 0.1 mm. A D≥0.4 mm is also conceivable in light of the total system optimization. In one embodiment, a minimum flow may need to be maintained to allow for the cooling of the fluid inside the cavity as the force generated ΔF does work on the outside environment.

Total Flow Rate Per Unit Area

In one embodiment, the total flow rate per unit area of the fluid through the plurality of conduits is less than one selected from the group 0.001, 0.01, 0.1, 0.2, 0.4, 0.5, 0.8, 0.9, 1, 1.1, 1.5, 2, 4, 8, 10, 20, 50, 100, 200, 400, 500, 1000, and 5000 m$^3$/m$^2$s. In another embodiment, the total flow rate per unit area of the fluid through the plurality of conduits is greater than one selected from the group 0.001, 0.01, 0.1, 0.2, 0.4, 0.5, 0.8, 0.9, 1, 1.1, 1.5, 2, 4, 8, 10, 20, 50, 100, 200, 400, 500, 1000, and 5000 m$^3$/m$^2$s.

Reaction Force, $F_R$

In one embodiment, the reaction force, $F_R$, is less than or equal to the difference ΔPΔA−$F_W$ and the total flow rate per unit area is also low. In one embodiment, the reaction force $F_R$ is less than one selected from the group: 1000, 500, 100, 50, 20, 18, 16, 14, 12, 10, 5, and 1 gm/m$^2$. In another embodiment, the reaction force $F_R$ is greater than one selected from the group: 1000, 500, 100, 50, 20, 18, 16, 14, 12, 10, 5, and 1 gm/m$^2$.

Length of the Conduits, L

In one embodiment, the length of the conduits, L, is chosen to optimize the total flow of the fluid out of the cavity (or into the cavity) and minimize the wall force $F_W$. In one embodiment, a long L is chosen and results in a smaller flow rate which is generally desirable. In one embodiment, the length of the conduits, L, or the average length of the conduits, $L_{avg}$ is greater than one selected from the group: 10, 50, 100, 200, 400, 800, 1500, 2000, and 5000 millimeters. Modeling of select embodiments suggests that a L≥100 mm is desirable to keep flow rate low. In another embodiment, the length of the conduits, L, or the average length of the conduits, $L_{avg}$ is less than one selected from the group: 10, 50, 100, 200, 400, 800, 1500, 2000, and 5000 millimeters. An L≤100 mm is also conceivable in light of the total system optimization.

L/D Ratio

In one embodiment, the ratio of the length of the conduits to the largest cross-sectional dimension, D of the conduits in plane orthogonal to the axis of the conduit is greater than one selected from the group: 0.5, 0.8, 0.9, 1, 1.1, 1.5, 2, 4, 8, 10, 20, 50, 100, 200, 400, 500, 1000, and 5000 to 1. In another embodiment, the ratio of the length of the conduit (or average length) to the largest cross-sectional dimension (or average cross-sectional dimension) of the conduit, D, is less than one selected from the group: 0.5, 0.8, 0.9, 1, 1.1, 1.5, 2, 4, 8, 10, 20, 50, 100, 200, 400, 500, 1000, and 5000 to 1. In some embodiments, an AFT with a ratio L/D>>1 is a typical condition. In some embodiments, a large L/D ratio, such as L/D>>1, ensures a low flow rate and low reaction force. In some embodiments, modeling suggests that L/D≥500 creates a large ΔF, a low $F_W$ and a low Q which consequently results in a low $F_R$—all of which are generally desirable. However, a L/D≤500 may also be acceptable given the constraints of the design. In some embodiments, a minimum flow may need to be maintained to allow for the cooling of the fluid inside the cavity as the force generated ΔF does work on the outside environment. In one embodiment, the largest cross-sectional dimension, D, of the conduits, the length of the conduit, L, or both vary in the arrangement of conduits, or may be varied as needed to optimize the whole system performance.

Pressure Difference, ΔP

The difference in pressure ΔP=$P_1$−$P_0$ can be greater than zero or less than zero. In one embodiment, the difference in pressure ΔP is greater than one selected from the group −1,000,000, −100,000, −10,000, −1000, −500, −100, −50, −20, −10, −5, −2, −1, 1, 0, 1, 2, 5, 10, 20, 50, 100, 500, 1000, 10,000, 100,000, and 1,000,000 standard atmospheres. In one embodiment, the difference in pressure ΔP is less than one selected from the group −1,000,000, −100,000, −10,000, −1000, −500, −100, −50, −20, −10, −5, −2, −1, 1, 0, 1, 2, 5, 10, 20, 50, 100, 500, 1000, 10,000, 100,000, and 1,000,000 standard atmospheres.

It is also understood that any methods known in the art to create a pressure difference can be employed to create the pressure difference for the AFT including but not limited to heating, cooling, using fans, boiling, freezing, tapping stored compressed gases, chemical reactions, pumps, compressors, turbines and combustion.

In one embodiment, an AFT system has high ΔF and a very low Q with a correspondingly low $F_R$.

In another embodiment, a source of heat may be used to offset the cooling of the fluid inside the cavity that results from work done on the environment by the force generated ΔF especially in cases where it is desirable to keep the flow rate low.

AFT Device

Figure 5:
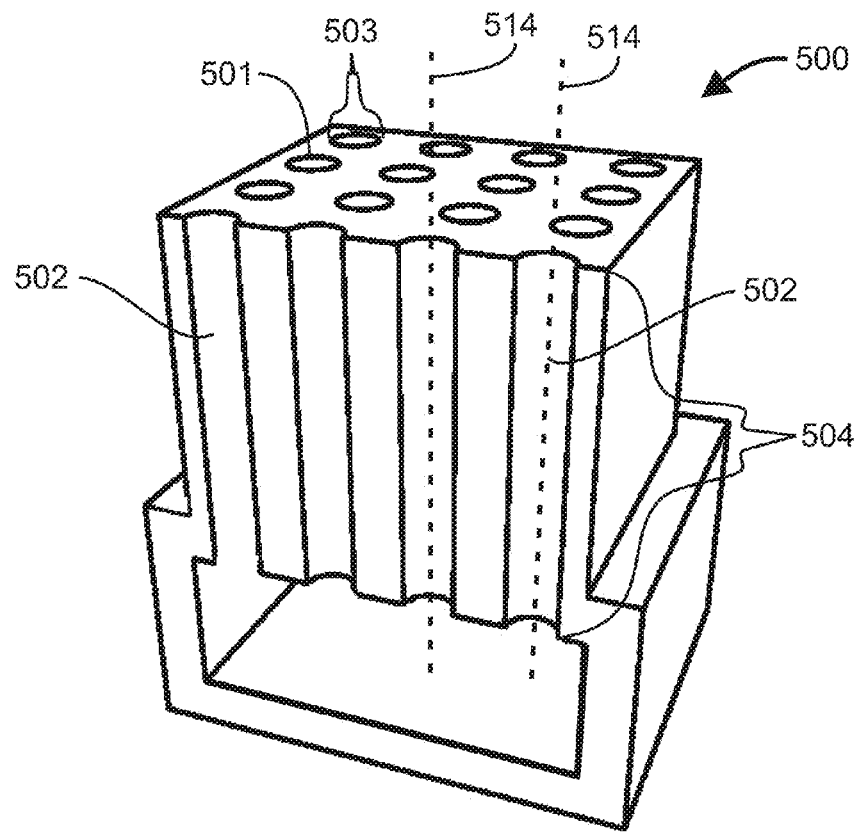
FIG. 5 is a perspective view of an AFT comprising tube shaped conduits.

Consider a rigid, rectangular container designed such that two opposing faces have a net area difference between the two faces defined by cross-sectional areas of openings to conduits as shown in FIG. 5. This area difference can be accomplished by having openings 501 to conduits 502 on one face and no openings on the opposite face. The conduits can extend from the interior cavity of the container along a conduit axis 514. Furthermore, these conduits could be circular in cross section with a largest cross-sectional dimension 503, D, (such as the diameter) in a plane perpendicular to the axis 514 of the conduit. These conduits can take the form of tubes 502 of length 504 L and inner diameter 503, D, as depicted in FIG. 5.

In some embodiments, the total surface area of the face without openings could vary from less than a square meter to tens or hundreds of square meters in size depending on the application. Factors affecting the thickness of the container, cavity, or device include the length L of the conduits, and the height of the cavity above the conduit openings and under the opposing surface without the openings. In some embodiments, the container thickness can vary from a less than a few millimeters or centimeters to over a meter or several meters depending on design constraints. The number of exit ports or openings to conduits can vary from tens to millions or more depending on the total size and the exit port diameters and packing density.

In some embodiments, the ratio $L/(D>>1)$ is a condition that typifies the AFT. In some embodiments, this ratio ensures a low flow rate and low reaction force. In one example AFT, an $L/D \approx 500$ creates a large $\Delta F$, a low $F_W$ and a low Q which consequently results in a low $F_R$. As an example of an ATF consider a device with a cavity and an array of conduits in the form of close packed tubes extending from the cavity with L=200 mm, inner diameter of 0.1 mm and outer diameter of 0.12 which creates a fill factor $\alpha$=62.98%. A pressure differential of $\Delta P$=0.05 atm, creates a flow rate per unit area of Q=0.18 $m^3/m^2$s and a net force per unit area $\Delta F$=60.5 $kg/m^2$. The reaction force is $F_R$=18 $gm/m^2$, which is low.

The container, cavity, or device can be created from any number of materials that allow for the necessary rigidity and ability for the designed openings to be created. These include glass, ceramics, certain polymers, carbon fiber reinforced plastic, titanium, aluminum, metal, thermoplastics, thermosets, rubbers, organic materials, inorganic materials, fiber reinforced materials, combination of one or more of the aforementioned materials, and other such materials that can be chosen by an expert or those materials known in the industry.

A pressure difference $\Delta P$ is maintained between the cavity within the AFT and the environment during the time periods when generation of a force is desired. At other times, such as re-charging a pressurized tank or periods of non-use of the device comprising the AFT, the pressure difference may be zero (equalized). The pressure difference needed for force generation will depend on the application and the target flow rates that are sustainable by the mechanism that maintains the pressure. For example fans along the lateral faces of the cavity can blow air into the cavity to maintain a higher pressure than the atmosphere. Or the same fans can blow air out of the cavity to maintain a lower pressure than the atmosphere. The incremental pressures can range from fractions of an atmosphere (10%) to several times the atmospheric pressure (100%, 200% or higher). Other methods of generating a pressure difference like steam, raising the temperature, combustion, compressors, turbines, or using compressed air and a combination of these are also acceptable methods as described earlier. It is understood that there is also a source of power to drive the pressure generating mechanisms which may include battery, combustion, solar, wind generated, chemical reaction, or other known forms of generating energy. There is also a source of control that governs the pressure to maintain the needed force necessary for the application, such as pressure regulator.

In other embodiments, the AFT is combined with other force generating devices such as engines, motors, other transducers, or other force generating or transferring devices, such as known in the industry.

In one embodiment, the aerostatic force exclusive of a buoyancy force acting on the device is greater than one selected from the group: 5%, 10%, 20%, 25%, 30%, 35%, 40%, 45%, 50%, 55%, 60%, 65%, 70%, 75%, 80%, 85%, 90%, and 95% of the total force acting on the device due to a reaction force, the aerostatic force exclusive of a buoyancy force, and a buoyancy force.

Applications of an AFT

The following are some of the applications of such an AFT: motor, generator, rotary motor; propulsion of ground or sea vehicles; propulsion of undersea vehicles; alternate to ground effect vehicles; thrust for lift of airborne vehicles; thrust or lift for ground, water, or air craft; construction platforms for high rise buildings; freight handling; and power generation.

Rotary Motor Comprising an AFT

Figure 6:
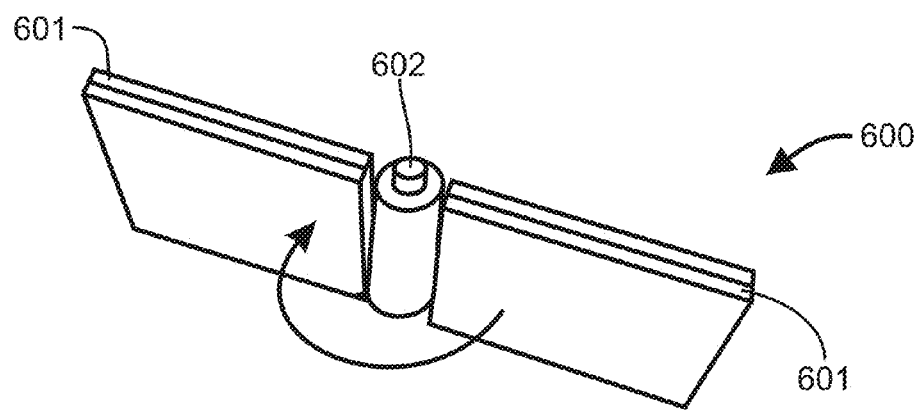
FIG. 6 is a perspective view of a rotary motor comprising two AFT plates arranged around an axis.

In one embodiment, a rotary motor 600 comprises two AFT plates 601 arranged around an axis 602 such that when the AFTs are activated, it causes the two plates to turn the axis causing rotary motion, as shown in FIG. 6. This could be used to replace applications where electrical motors or gas turbines are used today. These motors can be attached to generators to generate electrical power. In another embodiment, a rotary motor comprising one or more AFTs is used to provide propulsion, or raise loads. The force generate on each AFT plate can be adjusted for the speeds and torque needed for the specific application.

Propulsion for Ground and Sea Vehicles

Figure 7:
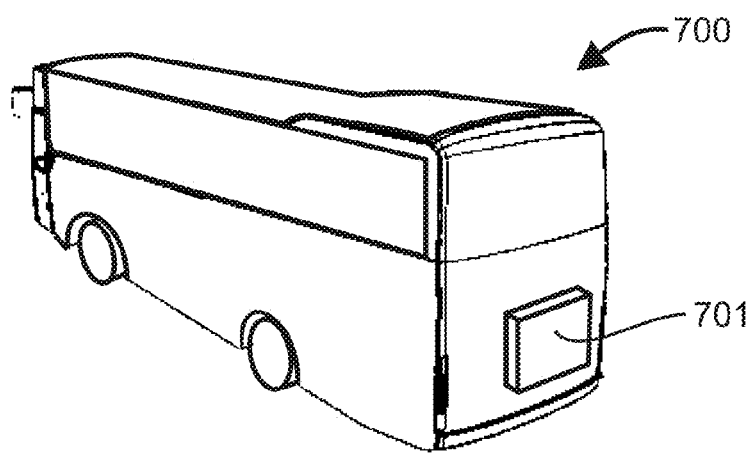
FIG. 7 is perspective view of one embodiment of a ground vehicle comprising an AFT for propulsion.

In one embodiment, a ground or water vehicle comprises an AFT that is used to provide propulsion and/or lift. FIG. 7 is an illustrative example of one embodiment of a ground vehicle 700 comprising an AFT 701 for propulsion and is illustrative of the principle of using an AFT in a ground vehicle. In the embodiment shown in FIG. 7, an AFT can be built on the back of the ground vehicle 700 (a bus in this example) such that it can propel the bus forward. In another embodiment, an AFT can be oriented on one or more sides (such as the opposite side) to provide a force in the opposite or other direction. Even though this illustration shows the AFT outside the body, it clearly does not need to be outside and can be inside the vehicle.

EQUIVALENTS

Those skilled in the art will recognize, or be able to ascertain using no more than routine experimentation, numerous equivalents to the specific procedures described herein. Such equivalents are considered to be within the scope of the invention. Various substitutions, alterations, and modifications may be made to the invention without departing from the spirit and scope of the invention. Other aspects, advantages, and modifications are within the scope of the invention. The contents of all references, issued patents, and published patent applications cited throughout this application are hereby incorporated by reference. The appropriate components, processes, and methods of those patents, applications and other documents may be selected for the invention and embodiments thereof. This application is intended to cover any adaptations or variations of the specific embodiments discussed herein. Therefore, it is intended that this disclosure be limited only by the claims and the equivalents thereof. Heading are for convenience only.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

What is claimed is:

1. A device comprising:
a cavity;
a first fluid within the cavity at a first internal pressure;
a first internal surface of the cavity;
a second internal surface of the cavity opposite the first internal surface in a first direction;
a plurality of conduits extending through the first internal surface from the cavity to a second fluid in an environment surrounding the device with a second pressure different from the first internal pressure by a pressure difference, each conduit of the plurality of conduits comprises an opening at the first internal surface through which the first fluid or second fluid flows between the cavity and the environment surrounding the device,
wherein
each opening contributes to a combined surface area difference between the first internal surface and the second internal surface;
the plurality of conduits has an average length along their axis and an average largest inner cross-sectional dimension in a first plane orthogonal to the axis of the conduit;
the average length divided by the average largest inner cross-sectional dimension is greater than 20; and
the first fluid or second fluid flows through the plurality of conduits such that the pressure difference acting on the surface area difference creates a net force acting on the device in the first direction greater than a reaction force acting on the device in the first direction.

2. The device of claim 1 wherein a largest inner cross-sectional dimension of each conduit of the plurality of conduits is less than 0.4 millimeters.

3. The device of claim 1 wherein the plurality of conduits comprises more than 50 conduits.

4. The device of claim 1 wherein the plurality of conduits comprises more than 10 conduits.

5. The device of claim 4 wherein a largest inner cross-sectional dimension of each conduit of the plurality of conduits is less than 1 millimeter.

6. The device of claim 4 wherein each conduit of the plurality of conduits has a length along an axis of the conduit greater than 50 millimeters.

7. The device of claim 4 wherein the average length divided by the average largest inner cross-sectional dimension is greater than 50.

8. The device of claim 4 wherein for each conduit of the plurality of conduits the axis of the conduit is normal to the first internal surface of the cavity.

9. A method of generating a net force acting on a device in a first direction, the method comprising:
generating a pressure difference between a cavity within the device and an environment surrounding the device;
creating a combined surface area difference between two opposing internal surfaces of the cavity using openings in a plurality of conduits extending from the cavity to the environment surrounding the device; and
configuring the plurality of conduits to have an average length along axes of the conduits and an average largest inner cross-sectional dimension in planes orthogonal to the axes of the conduits such that the average length divided by the average largest inner cross-sectional dimension is greater than 20 and the pressure difference acting on the combined surface area difference creates a net force acting on the device in the first direction greater than a reaction force acting on the device in the first direction.

10. The method of claim 9 wherein configuring the plurality of conduits further comprises configuring each conduit to have a length along an axis of the conduit and a largest inner cross-sectional dimension in a plane orthogonal to the axis of the conduit such that the length of the conduit divided by the largest inner cross-sectional dimension is greater than 50.

11. The method of claim 9 further comprising configuring the plurality of conduits to comprise more than 10 conduits.

12. The method of claim 11 further comprising configuring each conduit of the plurality of conduits to have a largest inner cross-sectional dimension in a plane orthogonal to an axis of the conduit less than 1 millimeter.

13. A device comprising:
a first internal surface;
a second internal surface opposite the first internal surface;
a cavity defined at least by the first internal surface and the second internal surface;
a first fluid within the cavity at a first pressure different from a second pressure of a second fluid in an environment surrounding the device by a pressure difference;
a plurality of conduits, each conduit of the plurality of conduits has an axis parallel to a first direction, each conduit of the plurality of conduits comprises an opening at the first internal surface through which the first fluid or the second fluid flows between the environment surrounding the device and the cavity, each opening of the plurality of conduits contributes to a combined surface area difference between the first internal surface and the second internal surface;
wherein for each conduit a length of the conduit along the axis of the conduit divided by a largest inner cross-sectional dimension of the conduit in a plane orthogonal to the axis of the conduit is greater than 20 such that a net aerostatic force in the first direction acts upon the device due to the pressure difference acting on the combined surface area difference and the net aerostatic force acting on the device in the first direction is greater than a total force acting on the device in the first direction due to a reaction force and a buoyancy force.

14. The device of claim 13 wherein the plurality of conduits comprises more than 50 conduits.

15. The device of claim 13 wherein the length of each conduit of the plurality of conduits is greater than 50 millimeters.

16. The device of claim 13 wherein the plurality of conduits comprises more than 10 conduits.

17. The device of claim 16 wherein the largest inner cross-sectional dimension of each conduit is less than 1 millimeter.

18. The device of claim 16 wherein for each conduit the length of the conduit along the axis of the conduit divided by the largest inner cross-sectional dimension of the conduit in the plane orthogonal to the axis of the conduit is greater than 50.

19. The device of claim 16 wherein for each conduit, the axis of the conduit is perpendicular to the first internal surface of the cavity.

20. The device of claim 16 wherein the pressure difference is generated through one or more processes or devices selected from the group: heating, cooling, using fans, boiling, freezing, tapping stored compressed gas, chemical reactions, pumps, and combustion.

* * * * *